Dec. 10, 1957  H. LAUB III  2,815,870
PALLET LOADING MACHINE
Filed June 25, 1951  6 Sheets-Sheet 1

INVENTOR.
HERMAN LAUB III
BY R. E. Geanque
ATTORNEY

INVENTOR,
HERMAN LAUB III
BY R.E. Jeanque
ATTORNEY

Dec. 10, 1957     H. LAUB III     2,815,870
PALLET LOADING MACHINE
Filed June 25, 1951     6 Sheets-Sheet 3

INVENTOR,
HERMAN LAUB III
BY R. E. Geangue
ATTORNEY

Dec. 10, 1957 H. LAUB III 2,815,870
PALLET LOADING MACHINE
Filed June 25, 1951 6 Sheets-Sheet 4
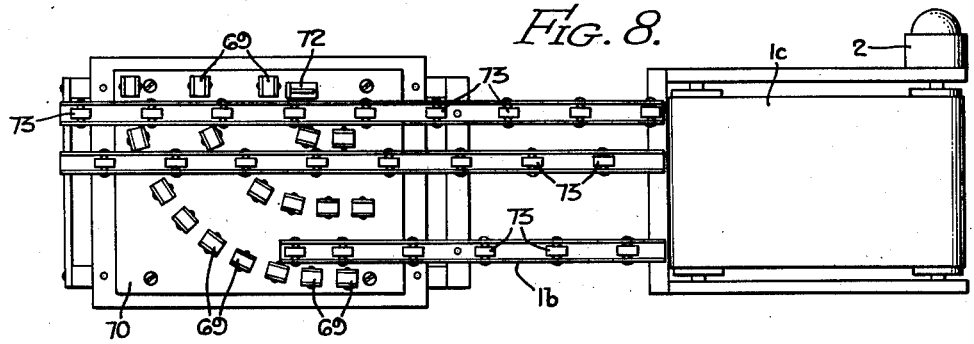
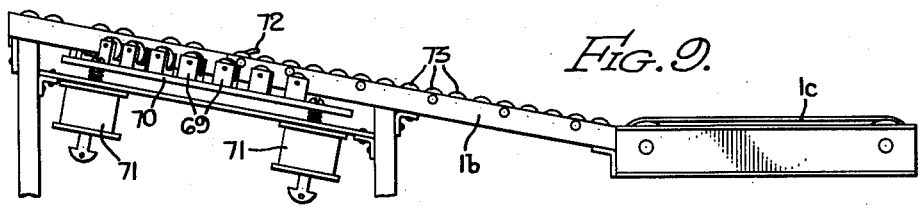
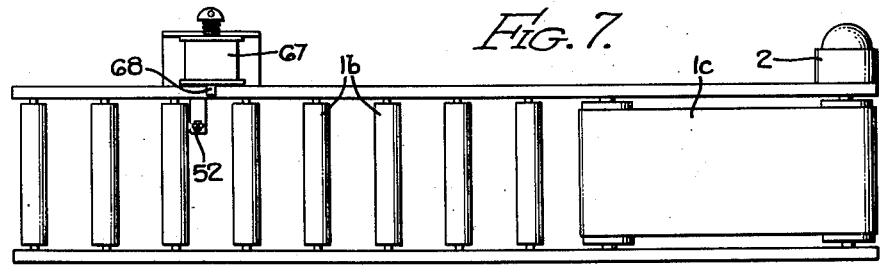
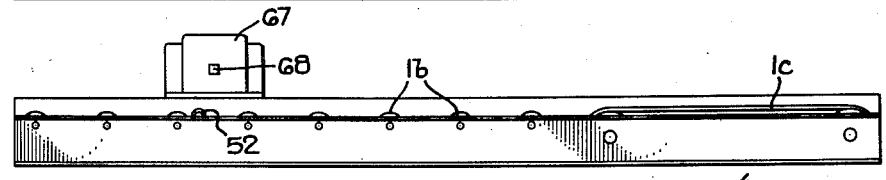
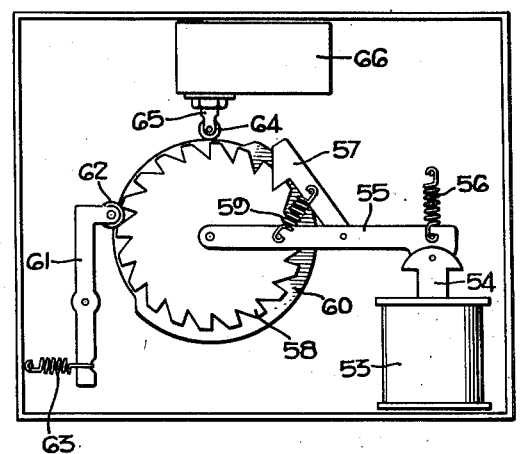
INVENTOR,
HERMAN LAUB III
BY
R. E. Geangue
ATTORNEY Dec. 10, 1957  H. LAUB III  2,815,870
PALLET LOADING MACHINE Filed June 25, 1951  6 Sheets-Sheet 5

INVENTOR,
HERMAN LAUB III
BY R. E. Granque
ATTORNEY

United States Patent Office 2,815,870
Patented Dec. 10, 1957

2,815,870

PALLET LOADING MACHINE

Herman Laub III, Paramount, Calif., assignor of fifteen percent to Robert E. Geauque, Van Nuys, Calif.

Application June 25, 1951, Serial No. 233,401

9 Claims. (Cl. 214—6)

This invention relates to a pallet loading machine and more particularly to a machine which can quickly load containers upon a pallet because the movement of the containers and pallet is held to a minimum during the loading operation. A variety of loading patterns can be obtained depending upon the size of container and product to be loaded and minimum amount of power is required to operate the machine since gravity feed of the containers and pallet is utilized wherever possible.

In prior loading devices, it has been customary to accumulate one layer of containers at a time and then move the accumulated layers into position over the pallet so that it can be loaded onto the pallet. Also, it has been customary to first raise the pallet into loading position and then lower the pallet step by step as the layers of containers are loaded on the pallet. During the time the pallet is being raised, the loading operation must be interrupted which results in considerable reduction in efficiency of the machine. In the present invention, the containers are continuously fed into the machine and the layers are accumulated directly over the pallet so that it is not necessary to move a complete layer into a position to be received by the pallet. Also, the empty pallets are placed into the machine in a position to receive the first layer of boxes without having to be elevated into this position and thus, the machine is greatly simplified and more economical to construct and operate.

The conveyor which supplies containers to the pallet is equipped with a device for turning selected containers to produce the desired pattern of containers for each layer and for the complete load. All movement of the containers will be downward and thus the force of gravity will be utilized to a maximum extent. Also, all controls for the machine are positively operated by the containers themselves so that the containers must be in proper position before machine movements can take place.

It is therefore an object of this invention to provide a pallet loading machine in which containers can be continuously loaded directly over the pallet and in which all movements of the containers and pallets are in the downward direction.

A further object of this invention is to provide means for quickly loading a layer of containers on to the pallet after the layer has been accumulated.

A further object of this invention is to provide means for placing empty pallets in loading position with a minimum of movement so that the pallets will be moved only in the downward direction.

Another object of the invention is to provide a pallet loading machine which can handle various sizes of containers without any major adjustment of the machine or of the control system for the machine.

Another object is the provision of a mechanical loading device which is capable of forming various types of interlocked loads upon the pallet.

A still further object is to provide a control system for the machine which is actuated solely by the containers being loaded so that the controls are forcefully actuated to assure the proper sequence of operations of the machine.

These, and other objects not specifically set forth above, will become more fully apparent from the following description and accompanying drawings in which:

Figure 5 is a plan view of the controls for one modification of a container-turning device.

Figure 6 is a side elevational view of the container-feeding conveyor, showing the turning arm.

Figure 7 is a top plan view of the feeding conveyor shown in Figure 6.

Figure 8 is a top plan view of a second modification of a container-turning device consisting of individual gravity rolls.

Figure 9 is a side elevational view of the container-turning device shown in Figure 8.

Figure 1:
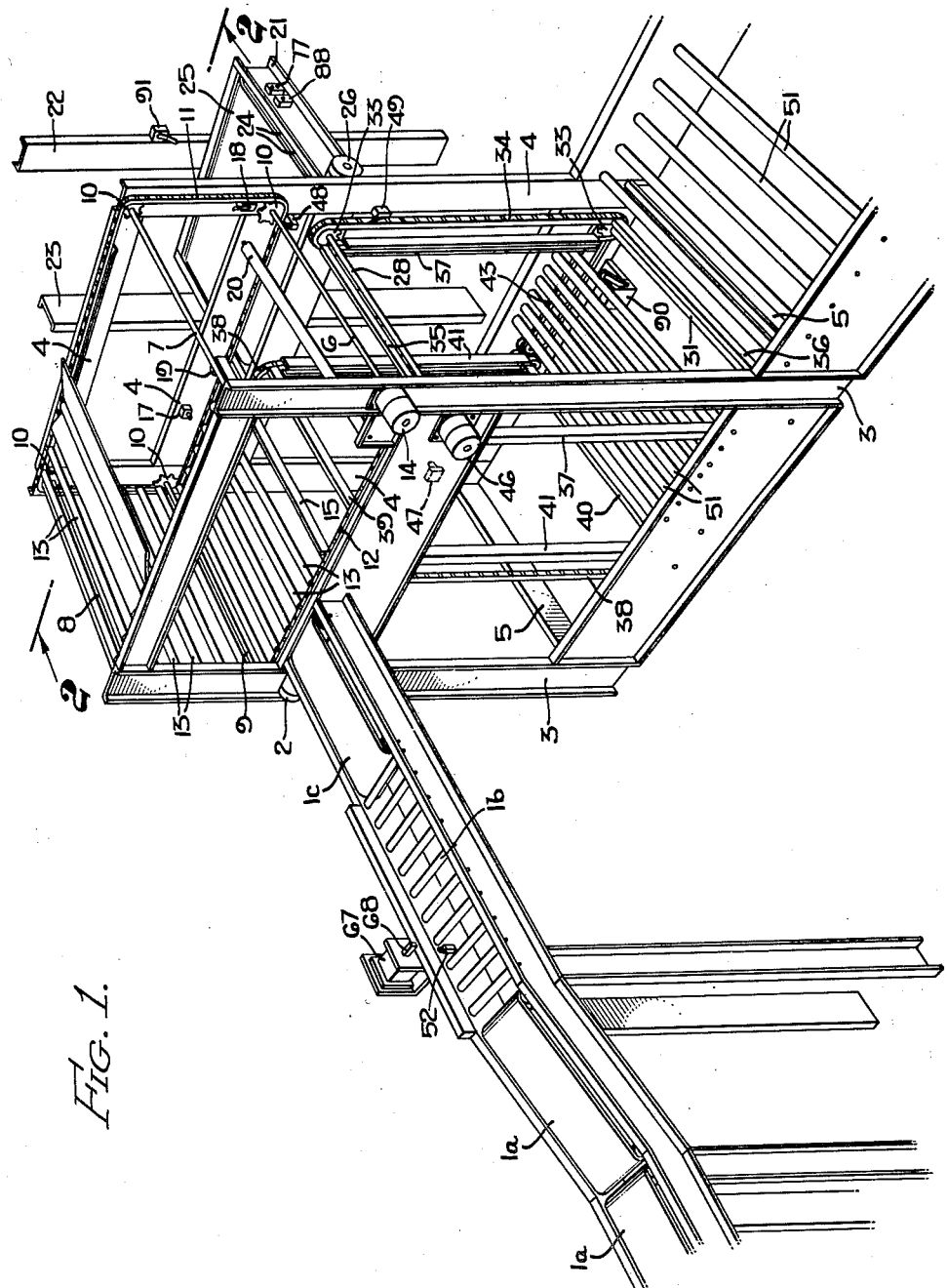
Figure 1 is a perspective view of the pallet loading machine of this invention showing layer accumulator in a position to receive containers.

The machine structure selected for illustrating the present invention is generally shown in Figure 1 and comprises three conveyors; namely, an elevator $1a$, a live roll conveyor $1b$, and a traction top belt conveyor $1c$, which are all driven by motor 2. The elevator $1a$ raises the cases from the manufacturing floor to the accumulator height, the live rolls $1b$ in connection with a turning device arrange the cases to produce the desired pattern and conveyor $1c$ forces the cases onto the accumulator. The loading section of the machine is supported by two similar channel iron frames 3 and 4 which are connected together by cross members 5. Shafts 6, 7, 8 and 9 extend between the two frame sections and have one end pivotally mounted in frame section 3 and one end pivotally mounted in frame section 4. A cog wheel 10 is mounted on each shaft and positioned adjacent to frame section 4 and these four cog wheels serve as a guide for continuous chain 11. Since the shafts 6 and 7 are mounted at one end of the frame sections and the shafts 8 and 9 are mounted at the other, chain 11 passing over cog wheels 10 assumes a rectangular shape.

Similar cog wheels (not shown) are mounted on each of the shafts in a position adjacent to the frame section 3. Chain 12 passes around these cog wheels to assume the same shape as chain 11. A series of accumulator rollers 13 have their ends attached to chains 11 and 12 so that the rollers will move with the chains and at the same time be free to revolve. An electric motor 14 is mounted on frame section 3 and is directly connected to shaft 6 so that when shaft 6 is rotated by the motor, the rollers 13 can be moved around the rectangular path of chains 11 and 12. Angle iron member 15 also extends between and moves with the chains and serves to hold the containers on the rollers 13. A plate 16 (see Figure 2) is secured to frame 3 and projects under rolls 13 in such a manner that the rolls when coming into contact with the plate, will be rotated by the plate in the direction of the arrows and will force containers resting upon the rolls toward member 15 and thereby pack the cases upon the rolls closely together.

When the rolls 13 are in the position shown in Figure 1, they are placed to receive the first row of cases from belt 1c. The first case of this row will be moved across rolls 13 by the following cases until the first case strikes the micro switch 17. When this switch is actuated, the motor 2 will be stopped and motor 14 will be started in order to move the rolls 13 and the first row of cases thereon to the right. As soon as the first case of the first row is moved out of contact with switch 17, the motor 14 will be de-energized and motor 2 will start again in order to load the second row of cases onto the accumulator. The first row will have been moved far enough to the right so that it will not interfere with the second row as it comes onto the accumulator. After the complete second row has been loaded, switch 17 will again be actuated and the rolls 13 will again move to the right so that another row can be added. This accumulating process will continue until the desired number of rows have been placed on the accumulator to provide a desired layer.

Figure 4:
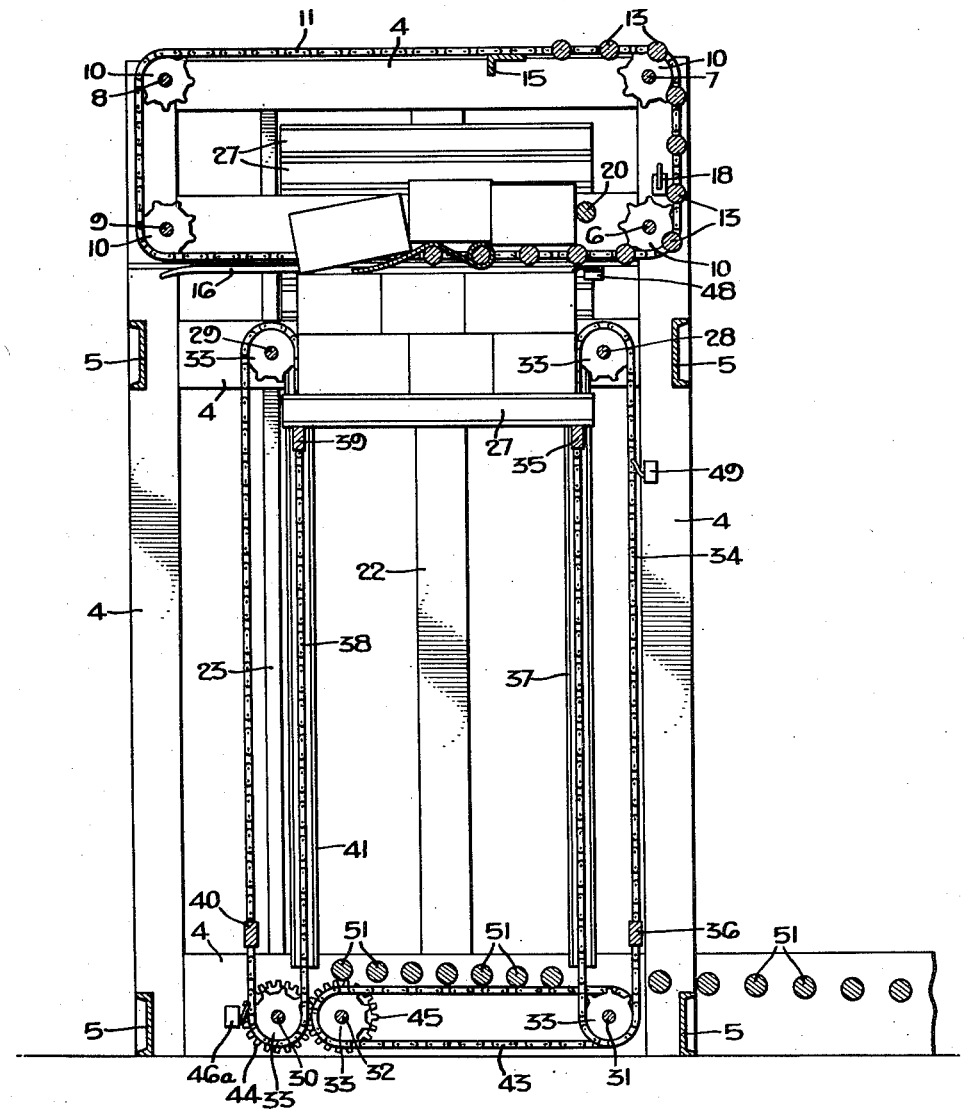
Figure 4 is a vertical sectional view similar to Figure 2, showing containers leaving the accumulating conveyor.

At the time the desired layer has been accumulated on the accumulator rolls, the member 15 will have moved, step by step to the right, into the position where it will depress the micro switch 18. The switch 18 will energize motor 14 and keep the motor running until the accumulator rolls 13 and member 15 have traversed their rectangular path and member 15 contacts micro switch 19. A roll 20 extends between frames 3 and 4 and across the path of the cases on the accumulator. As the accumulator 13 moves around its rectangular path, the roll 20 will prevent the cases from moving with the rolls of the accumulator and will cause the cases to drop off the end of the accumulator, one row at a time, as shown in Figure 4.

Figure 2:
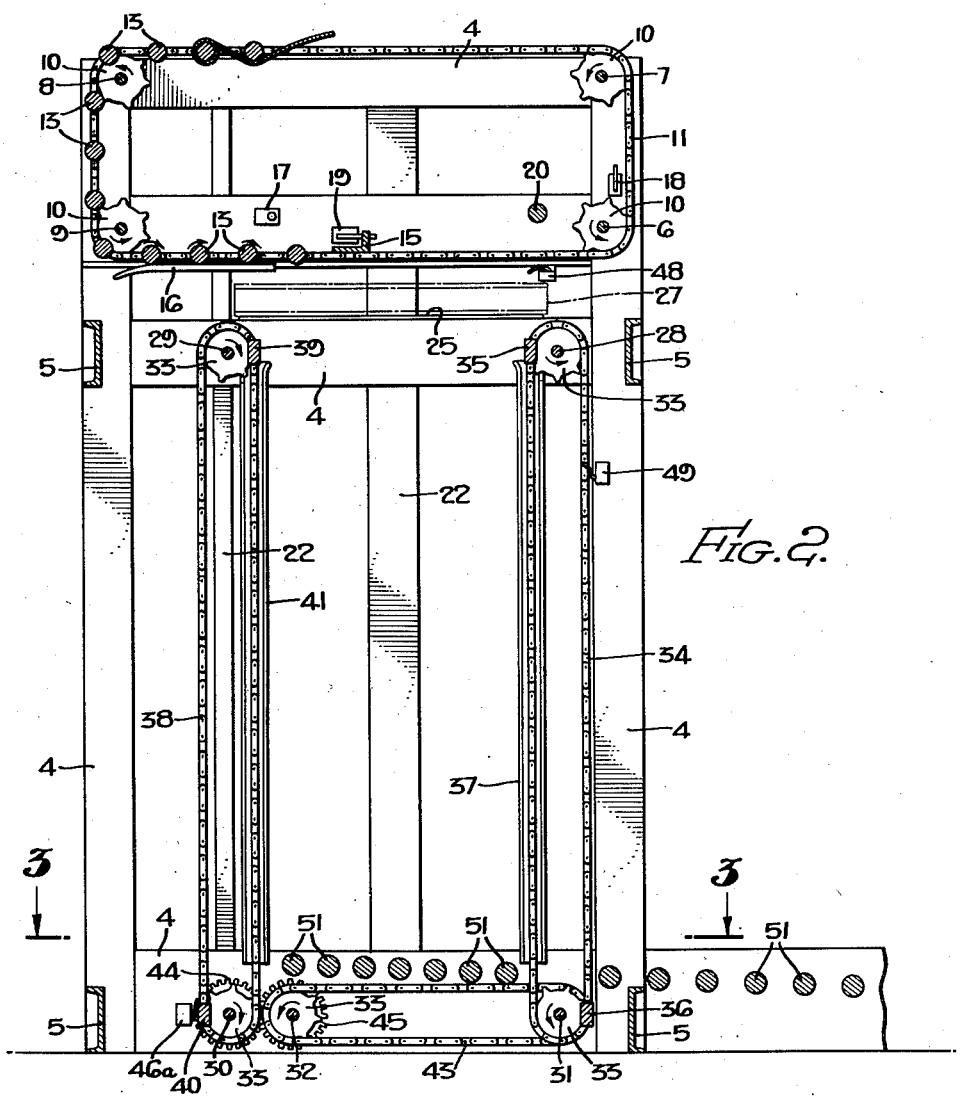
Figure 2 is a vertical sectional view taken along lines 2—2 of Figure 1, showing the flight bars in a position to receive an empty pallet.
Figure 3:
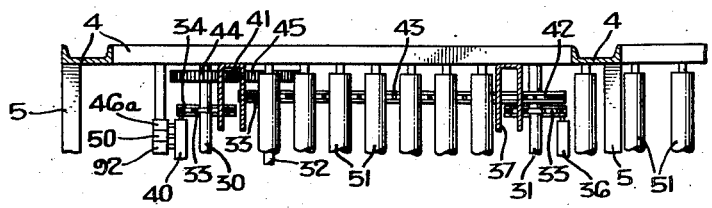
Figure 3 is a sectional view taken along lines 3—3 of Figure 2 and illustrating the gravity rolls for removing loaded pallets.

A three-sided frame 21 has its two ends welded to frame 4 and is supported by upright channels 22 and 23. Rolls 24 extend across the frame 21 and support a belt conveyor 25 which is driven by motor 26. The conveyor 25 is designed to support several empty pallets which can be fed into loading position by motor 26. The empty pallets are held in position on the conveyor by the upper portions of channels 22 and 23. In Figure 2, an empty pallet 27 is shown on conveyor 25 in its position prior to being moved into loading position.

Extending between frame sections 3 and 4 are a series of five rods, 28, 29, 30, 31 and 32 which have one end pivotally mounted on each frame (see Fig. 2). Each rod mounts two sprockets 33 so that one sprocket is adjacent each frame section. A pair of chains 34, only one of which is shown in Figure 2, extend around the two sprockets on the rods 28 and 31, and flight bars 35 and 36 extend between and are carried by the pair of chains 34. The flight bars 35 and 36 are spaced equidistant apart on the endless chains 34 and channels 37 are placed adjacent one section of each chain 34 to act as a guide for the chains and the flight bars during the time the chains 34 move about the sprockets 33.

In a similar manner, a pair of chains 38, only one of which is shown in Figure 2, extend around the two sprockets on the rods 29 and 30 and flight bars 39 and 40 extend between and are carried by the pair of chains 38. The flight bars 39 and 40 are also spaced equidistant apart on the endless chains 38, and both the chains and the flight bars are retained in position during movement by channels 41, only one of which is shown.

In addition to mounting a pair of sprockets 33, the rod 31 mounts another pair of sprockets 42. A pair of chains 43 extend around sprockets 42 on rod 31 and sprockets 33 on rod 32 so that rod 32 will rotate with and in the same direction as rod 31. Also, rods 30 and 32 mount gears 44 and 45 respectively which mesh so that rod 30 will be rotated by rod 32 in a direction opposite to that of rod 32. A motor 46 is connected to drive rod 28 in a direction so that flight bars 35 and 36 travel in the counterclockwise direction around the sprockets. Because of the linkage between rods 31 and 30, the motor 46 will move flight bars 39 and 40 in the clockwise direction.

Referring to Figure 2, a micro switch 46a is mounted on frame section 4 in a position to be actuated by either flight bar 39 or 40. When one of these flight bars contacts switch 46a, the other flight bar is in position to receive an empty pallet from conveyor 25 and therefore, switch 46a will actuate motor 26 and start the conveyor. A micro switch 47 is mounted on frame section 3 (see Figure 1) and is so positioned that it will be actuated by the empty pallet when the pallet is in position on the flight bars. Switch 47 will therefore stop motor 26 after the empty pallet has been properly positioned to be carried by one flight bar on each of the chains 34 and 38. Since an empty pallet can be placed in position in less time than it takes for the accumulator roll 13 to complete a cycle, the operation of the accumulator need never be interrupted during the positioning of an empty pallet.

After the empty pallet is positioned on the flight bars and below the accumulator rolls 13, it will be in position to receive the first layer of cases which accumulates on rolls 13. When the last row of cases of the first layer leaves the moving accumulator and falls onto the empty pallet, it will depress switch 48 and thereby cause motor 46 to drive chains 34 and 38 and lower the flight bars. This movement will continue until the flight bars have moved downwardly a sufficient amount to move the last row of cases out of contact with switch 48. The motor 46 will then be stopped and the pallet will be held in position to receive the second layer of cases. When the last row of the second layer leaves the accumulator, the switch 48 will again be actuated to cause motor 46 to lower the flight bars into position for the third layer. Any number of layers can be added to the pallet in this manner.

When the desired load has been assembled on the pallet, either flight bar 35 or 36 will be in position to depress switch 49. The flight bar which will actuate the switch will be the one which is not carrying the pallet. When depressed, the switch 49 continues the actuation of motor 46 until the flight bar on chain 38 carrying the pallet has moved around into position to depress switch 50. A series of gravity rolls 51 extend between frame sections 3 and 4 and as the flight bars move past the gravity rolls, the loaded pallet will be deposited on the gravity rolls and move on the rolls out of the machine where they may be removed by a lift truck. At the time switch 50 is actuated, the switch 46a is also actuated so that another empty pallet will be moved into loading position and the entire loading cycle will be repeated. The position of the pallet and flight bars during the loading operation is illustrated in Figure 4. Two layers of cases have been added to the pallet 27 and a third layer is leaving the accumulator rolls. As soon as the last roll of the third layer depresses switch 48, the flight bars and pallet will be moved downwardly to a position for receiving the fourth layer.

A case-turning device is used in connection with conveyor 1b in order to turn selected cases, and is shown in detail in Figures 5, 6 and 7. A micro switch 52 is placed between the rolls of conveyor 1b and projects above the rolls so that it can be actuated by individual cases along the rolls. When switch 52 is actuated by a single case, the solenoid 53 is energized moving armature 54 downwardly (see Figure 5). An arm 55 is pivotally mounted at one end and is secured to armature 54 at the other end and is continually raised in the upward direction by spring 56. One end of latch 57 is pivotally secured at the center of arm 55 and carries a projection which is continually forced against ratchet 58 by spring 59 secured to both arms 55 and 57.

A cam 60 is integral with the ratchet 58 and rotates with the ratchet about a common axis. The surface of the cam can be designed to obtain the desired loading pattern. Every time a case actuates switch 52, the latch 57 advances ratchet 58 and cam 60 the distance of one tooth. A lever 61 carries a roller 62 which is biased against the surface of the ratchet by spring 63 to hold the rachet in positive location.

A roller 64 continually rides upon the surface of cam 60 and is mounted on a spring-loaded switch arm 65 which operates switch 66. With arm 65 in the down position (see Figure 5), the switch 66 is open and if the arm is moved upwardly the switch 66 will be closed. When switch 66 is closed, the solenoid 67 will be energized and cause armature 68 to be moved into the path of the oncoming case. The armature 68 will be positioned by the energized solenoid so that it will catch a corner of the case which is being forced ahead by live rolls 1b. As the case moves past the armature, it will be turned 90 degrees since the armature will hold one corner of the case and leave the other corners free to turn.

Figure 10:
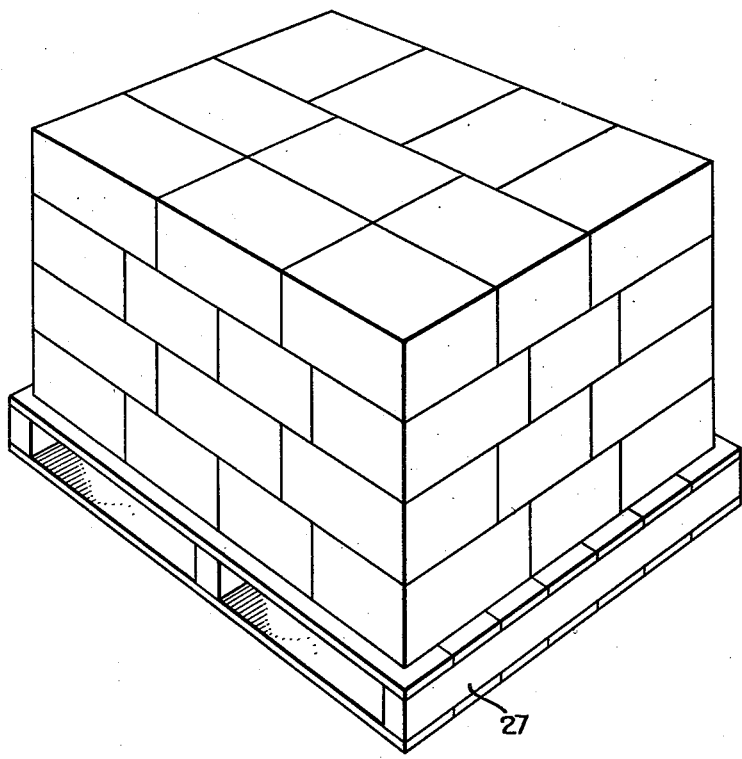
Figure 10 is an end perspective view of the interlocked pallet load which will be formed by the cam and rachet arrangement shown in Figure 5.

Thus, it is possible to turn selected cases before they are loaded onto the accumulator rolls and any desired pattern of pallet load can be obtained. In order to vary the pattern of pallet, it is only necessary to change the shape of cam 60 and the number of teeth in ratchet 58 so that the solenoid 67 will be energized at the proper time to give the desired pattern. With the cam and ratchet arrangement shown in Figure 5, each layer of the pallet load will have 6 cases turned by the armature 68 and four cases unturned. Since a complete rotation of cam 60 will result during the loading of two layers of cases, the turned and unturned rows will be reversed in successive layers (see Figure 10).

A modification of the case-turning device is illustrated in Figures 8 and 9 and is composed of a series of individual rolls 69 which are mounted on a plate 70. The plate 70 and the roll 69 are moved upwardly into turning position when the solenoid 71 has been energized by switch 66, the operation of which has been explained in connection with Figure 5. In this modification, the solenoid 53 of Figure 5 will be energized by a switch 72 shown in Figures 8 and 9. When in the turning position, the rolls 69 will project slightly above the gravity roll 73 of the conveyor 1b and will be so positioned that a case can only move over the rolls in a direction which will result in a 90 degree turn of the case. Any desired pattern can be obtained with this modification of turning device by the selection of the proper cam and ratchet arrangement.

With either of the turning devices described above, it is not necessary to have a continuous feed of cases since the turning device is actuated by each individual case. The righthand section of belt conveyor 1a (see Figure 1) moves faster than the lefthand section so that the individual cases will be spaced far enough apart that the preceding and the following case will not interfere with the turning action.

Figure 11:
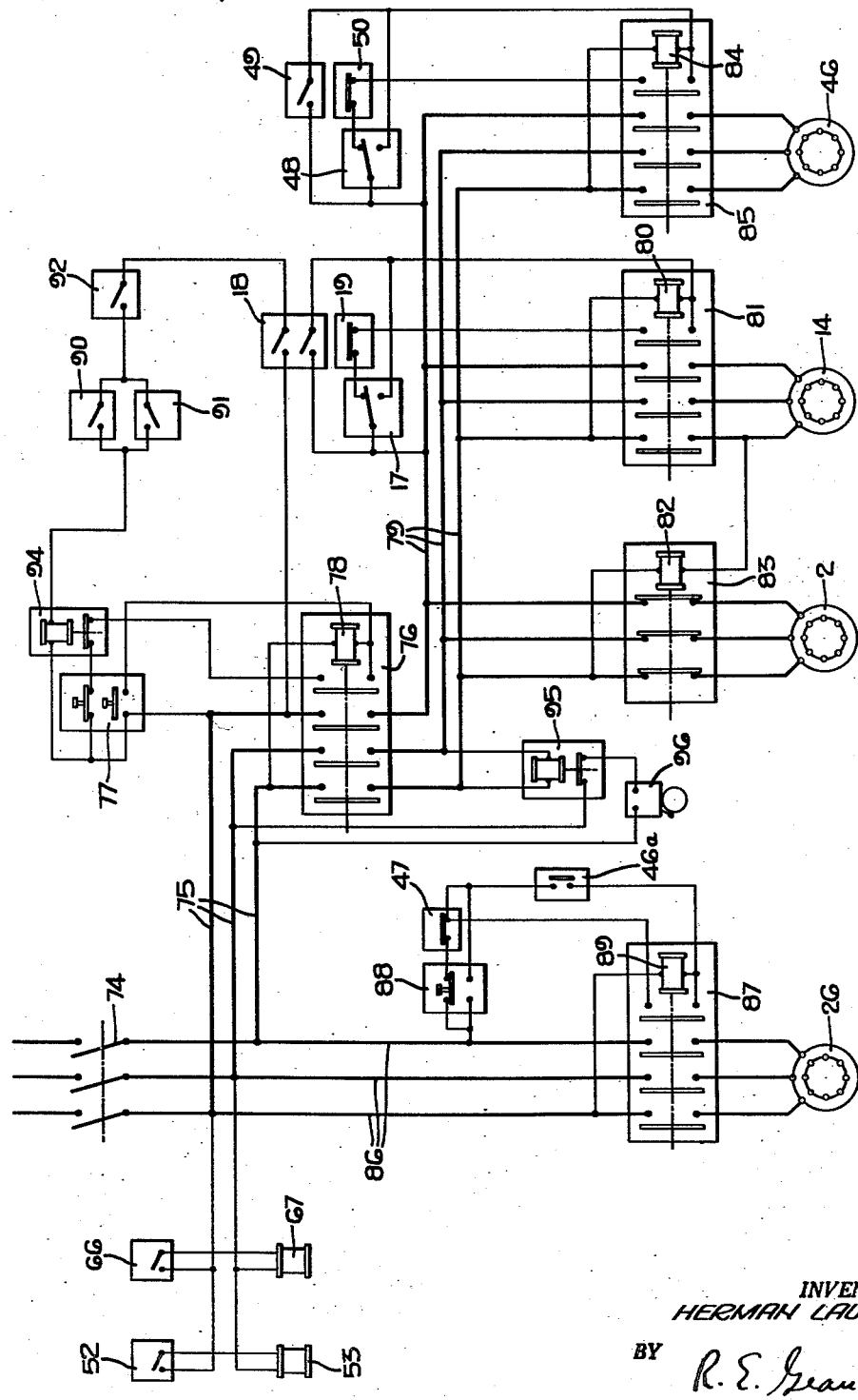
Figure 11 is a diagrammatic sketch of the control circuit used in connection with the pallet loading machine of this invention.

The wiring circuit to be used in connection with the pellet loading machine is shown diagrammatically in Figure 11. A source of 3-phase power is connected to the circuit through manually operated switch 74. The lines 75 connect magnetic starter 76 with switch 74. A normally opened spring loaded push button 77 controls the magnetic starter 76 through magnet 78. When the magnet 78 is energized, the contacts of the starter 76 will be closed and power will be supplied to line 79. Connected to one of the phases of line 79 and in series with magnet 80 of magnetic starter 81 are switches 17, 18 and 19. Switches 17 and 18 are in parallel with each other so that when either one is closed, magnet 80 is energized to run accumulator conveyor motor 14 and stop case belt conveyor motor 2. When switch 17 is depressed by a case, the magnet 80 will be energized as long as the case rests against the switch. After the case leaves switch 17, the magnet 80 will be de-energized during the time switch 17 moves to and remains in open position. After a layer has been accumulated on the accumulator, switch 18 will be closed by member 15 long enough to energize magnet 80 and since switch 19 is normally closed, the magnet 80 will continue to be energized even though switch 17 is in open position until the accumulator rolls have completed a cycle and member 15 opens switch 19. Since the magnet 82 of normally closed magnetic starter 83 is to the load side of starter 81, the magnet 82 will be energized to open starter 83 when starter 81 is closed. It is therefore apparent that case belt conveyor motor 2 will run continuously except when the accumulator conveyor motor 14 is running. With such an arrangement it will be impossible for cases to enter the accumulator until it has been properly positioned for receiving cases.

In order to control the movements of the flight bars, switches 48, 49 and 50 are placed in series with magnet 84 of magnetic starter 85. Switches 48 and 49 are in parallel with each other so that when either one is closed, magnet 84 is energized to cause motor 46 to move the flight bars. When switch 48 is depressed by the last row of cases leaving the accumulator, the magnet 84 will be energized to move the flight bars downward until the cases move out of contact with the switch and stop motor 46. Thus, the flight bars will be moved downwardly step by step to receive additional layers of cases. When a complete load has been received by the pallet, switch 49 will be depressed by one of the flight bars and since switch 50 is normally closed, the magnet 84 will be continuously energized until motor 46 has moved the flight bar into position to open switch 50 and 46a. During this last movement, the loaded pellet is deposited on the gravity rolls 51 and will move out of the loading machine. Also, the flight bars will again be positioned to receive a new empty pallet to be loaded at the time switch 50 is opened.

The lines 86 connect magnetic starter 87 with switch 74 and a jog button 88 and switches 46a and 47 are connected in series with magnet 89 of the starter. Since the switch 46a is actuated at the same time as the switch 50, the motor 26 will be started at the time that the flight bars are in position to receive an empty pallet and conveyor 25 will be driven to position the empty pallet on the flight bars. Once the empty pallet has been positioned, switch 47 will be opened to de-energize magnet 89 and motor 26 and switch 46a will not be closed again by the flight bars until a new pallet is required. The jog button 88 provides a means for manually controlling the loading of a new pallet at the time the machine is first started.

A safety circuit is connected between switch 18 and push button 77 and contains switches 90, 91, 92 and relay 94. If at any time switch 92 and either switch 90 or 91 is closed, the relay 94 will be energized and open the circuit through magnet 78. This will open starter 76 and will stop the operation of all components of the machine which are connected to the starter. When the starter 76 is open, the relay 95 will be de-energized and bell 96 will be placed in a circuit with lines 75. The ringing of bell 96 will immediately notify the plant personnel that the machine needs attention.

The switch 92 is located in the same position as switches 46a and 50 and will be closed when the flight bars are in position to receive an empty pallet. The switch 90 has a switch arm which will be depressed by a loaded pallet resting on gravity rolls 51 and therefore, should the flight bars reach the position to receive a new pallet while the previously loaded pallet is still in the machine, the magnetic starter 76 will be opened and bell 96 will ring. The switch 91 is located on channel 22 and will be closed when there are no pallets resting on conveyor 25. Therefore, if no empty pallets are available when the flight bars reach a position to receive one, the magnetic starter will be opened to prevent additional accumulation of cases in the machine and bell 96 will ring to notify personnel of this condition.

The switches 52 and 66 as well as solenoids 53 and 67 which are included in the case-turning device are shown connected across two phases of the power supply at switch 74.

From the above description, it is apparent that a pallet loading machine has been invented which will greatly simplify the handling and loading of cases. A variety of pallet patterns can be obtained and a variety of case sizes can be accommodated. Positive and immediate control of the machine is possible since electric motors can supply all the required power. Various modifications are contemplated and may obviously be resorted to by those skilled in the art without departing from the spirit and scope of the invention, as hereinafter defined by the appended claims.

What is claimed is:

1. In a machine for loading a number of cases onto a pallet, a pair of chains spaced apart and forming identical closed paths, means for moving said chains, a series of rolls extending between said chains along a portion of said path, a conveyor for continuously moving cases one at a time onto said rolls until a row of cases is formed, means operated by the first case in said row to stop said conveyor means while said pair of chains move said rolls into position to receive the next row of cases.

2. In a machine as defined in claim 1 having means operated when said rolls receive a full layer of cases to move said rolls around said path and back into loading position and means for preventing said layer from moving with said rolls so that said rolls can move from underneath said layer.

3. A machine for automatically loading cases onto a pallet comprising accumulator means for accumulating a layer of cases, pallet supporting means positioned underneath said accumulator means and comprising a first pair of flight bars carried by a first pair of continuous chains, a second pair of flight bars carried by a second pair of continuous chains, and means for placing an empty pallet on one flight bar of each pair after said flight bars have been placed in position for the discharge of the first layer of cases from said accumulator means.

4. A machine as defined in claim 3 having means operated by each layer of cases received by said pallet to lower the flight bars supporting said pallet into position so that said pallet can receive the following layer of cases.

5. A machine as defined in claim 4 having means operated by the other flight bar of one pair after said pallet is fully loaded to cause the flight bars supporting said pallet to move continuously downward until said pallet is discharged from said machine.

6. A machine as defined in claim 5 having means operated by one of said pallet supporting flight bars after said loaded pallet is discharged to position the other flight bar of each pair in position to receive the next empty pallet.

7. In a machine for loading a number of cases onto a pallet, a first continuous means movable about a closed path, a second continuous means spaced from said first means and likewise movable about an identical closed path, third means extending between a portion of said first and second means to receive said cases and movable with said first and second means, and means for loading said cases on to said third means in a direction transverse to the movement of said third means.

8. A machine as defined in claim 7 having means for moving said first and second means about said closed path and means for holding said cases on said third means during said movement so that said third means can move from underneath said cases, said moving means being actuated when a full load of cases have been placed on said third means, and means for stopping the movement of said first and second means after said third means has been moved around said path to its initial loading position.

9. A machine for automatically loading cases onto a pallet comprising accumulator means for receiving one case at a time until a layer of cases is received and means for moving said accumulator means to unload said layer, said accumulator means being comprised of a pair of chains spaced apart and forming identical closed paths and a series of rolls extending between said chains along a portion of said path.

References Cited in the file of this patent

UNITED STATES PATENTS

| | | |
|---|---|---|
| 773,332 | Merrell | Oct. 25, 1904 |
| 1,028,766 | Montgomery | June 4, 1912 |
| 1,179,383 | Adderson | Apr. 18, 1916 |
| 1,545,225 | Zeh | July 7, 1925 |
| 1,639,576 | Semashko | Aug. 16, 1927 |
| 2,135,805 | Evans et al. | Nov. 8, 1938 |
| 2,401,592 | Von Stocker | June 4, 1946 |
| 2,501,961 | Paton | Mar. 28, 1950 |
| 2,593,343 | Rayburn et al. | Apr. 15, 1952 |
| 2,633,251 | Bruce | Mar. 31, 1953 |
| 2,637,450 | Eshelman | May 5, 1953 |
| 2,701,650 | Stevenson | Feb. 8, 1955 |